United States Patent Office 3,422,144
Patented Jan. 14, 1969

---

3,422,144
STABLE FREE RADICAL NITROXIDES
Arthur Kentaro Hoffmann, New Canaan, Conn., and Ernestine Gelbium Abraham, Cumberland, Md., assignors to American Cyanamid Company, Stamford, Conn., a corporation of Maine
No Drawing. Filed Apr. 27, 1965, Ser. No. 451,316
U.S. Cl. 260—570     6 Claims
Int. Cl. C07c 135/02

This invention relates to stable, free radical nitroxides of the formula

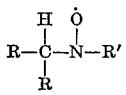

wherein R is selected from the group consisting of tertiary alkyl, aryl, alkaryl, haloaryl, carboxyaryl, alkoxyaryl, alkylthioaryl, pyridyl and dialkylaminoaryl, and R' is tertiary alkyl. R and R' as tertiary alkyl may have 4 to 8 carbon atoms, inclusive, and include radicals such as t-butyl, t-amyl, t-octyl (1,1,3,3-tetramethylbutyl), and the like. R as aryl includes phenyl, naphthyl, anthryl, phenanthryl, isomers thereof, and the like; R as alkaryl includes alkyl (preferably $C_1$–$C_4$)-substituted radicals of the foregoing aryl groups, e.g., tolyl, xylyl, ortho, meta and para isomers thereof, and methyl-, ethyl- and propyl-substituted naphthyl, anthryl, phenanthryl, and the like; R as haloaryl includes the fluorine, chlorine, and bromine substituted foregoing aryl radicals, e.g., chlorophenyl, dibromophenyl, chloronaphthyl, fluoronaphthyl, dibromoanthryl, and the like; R as carboxyaryl includes carboxyphenyl, and the like; R as alkoxyaryl includes mono-, di- and tri($C_1$–$C_4$)alkoxyphenyl, naphthyl, and the like; R as alkylthioaryl includes mono-, di- and tri($C_1$–$C_4$)thiophenyl, naphthyl, and the like; and R as dialkylaminoaryl includes di($C_1$–$C_8$)alkylaminophenyl, naphthyl, and the like, including normal and branched chain alkylaminoaryl substitutents. Typical among the latter values for R are o-dimethylaminophenyl, m-diethylaminophenyl, p-diethylaminophenyl, p-ethylmethylaminophenyl, p-dioctylaminophenyl, and the like. The free radical nitroxides of the invention also include compounds wherein the two R groups and R' are the same or mixed tertiary alkyl groups are the same or different, whether tertiary alkyl or other values defined above for R.

Coppinger et al., J. Am. Chem. Soc. 83, 4900 (1961), disclose that di-sec-alkyl nitroxides are formed in the reaction of hydroxylamines with t-alkylhydroperoxides. However, the products therein described are highly unstable free radicals and therefore of substantially no practical utility. The class of nitroxides of the present invention by contrast are stable, isolable, species with determinable melting points. These nitroxides are useful as traps for reactive free radicals both in the counting of free radicals and for inhibiting oxidation and free radical polymerization. In addition, the nitroxides are useful as paramagnetic standards in electron spin resonance spectrometry.

The nitroxides are prepared according to the following known process wherein R and R' are as defined above:

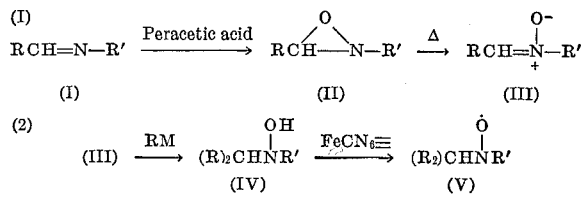

In step 1, a suitable imine is oxidized by a strong oxidizing agent such as peracetic acid to the oxazirane intermediate (II). This intermediate is then rearranged to the nitrone (III) in accordance with the method of W. D. Emmons, J. Am. Chem. Soc., 79, 5739 (1967). Alternatively, (III) may be prepared by the condensation of the t-alkyl hydroxylamine R'—NHOH and the appropriate aldehyde as follows:

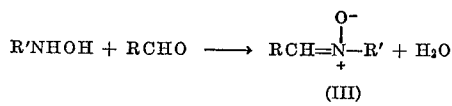

The nitrone (III) is then reacted with a suitable metal compound (RM), e.g., phenyl lithium, to form the disubstituted hydroxylamine (IV) which is then oxidized by ferricyanide ion, e.g., $Na_3FeCN_6$ or $K_3FeCN_6$, to the isolable free radical nitroxide (V).

Suitable starting imines (I) are disclosed, for example, in U.S. Patent 2,582,128 and J. Am. Chem. Soc., 66, 82 (1944), the subject matter of which is incorporated herein by reference.

The novel class of nitroxides of the invention do not depend on nor are they restricted to products prepared by the above procedure since the process of preparation may be substantially varied in known ways.

The stability of the class of nitroxides of the present invention is unexpected particularly in view of the discussion of Coppinger et al., J. Am. Chem. Soc., 83, 4900 (1961), who show unstable free radical di-sec-alkyl nitroxides among the oxidation products of amines. Moreover, in the same article it is proposed that the di-sec-alkyl nitroxide free radicals are so reactive as to be able to remove an alpha hydrogen atom from an amine (Equations 15 and 16 therein).

Although the reasons for the stability of the present class of nitroxides as compared to the Coppinger et al. products are not wholly known, it is believed that in the instant compounds the bulky substituents attached to the two carbon atoms alpha to the nitrogen atom prevent attack of the nitroxide group of one molecule at the hydrogen atom of another thus preventing disproportionation of the nitroxide radicals into hydroxylamine and nitrone, as probably occurs with the nitroxides of Coppinger et al.

In order that the present invention may be more completely understood, the following examples are given in which all parts are parts by weight unless otherwise specified. These examples are set forth primarily for the purpose of illustration and any specific enumeration of detail contained therein should not be interpreted as a limitation on the case except where indicated in the appended claims.

Example 1.—N-benzhydryl-N-t-butyl nitroxide

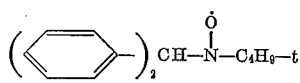

To a solution of 0.2 mole of phenyl lithium in 120 ml. of ethyl ether is added dropwise and with stirring 200 ml. of ether containing 26.5 g. (0.15 mole) of N-t-butylbenzaldoxime prepared by the method of W. D. Emmons, J. Am. Chem. Soc., 79, 5739 (1957). Addition is effected over about 40 minutes. During the exothermic reaction, a tan solid separates. After addition is complete the reaction mixture is hydrolyzed with 150 ml. of water. The ether layer is separated and the aqueous layer extracted with several small portions of ether. The ether extracts are combined and dried over anhydrous magnesium sulfate. The hydroxylamine may be used directly for the next step or converted with anhydrous hydrogen chloride to its hydrochloride for purification and storage. N-benzhydryl-N-t-butylhydroxylammonium chloride prepared according to this procedure weighed 41.8 g. (95.4% yield) and could be recrystallized form hot acetonitrile to give product of analytical purity, M.P. 178–179° C.

This hydroxylammonium salt, 30 g., is next suspended in 500 ml. of water to which is added 40 g. of sodium hydroxide in 200 ml. of water. After stirring for 15 minutes, 550 ml. of ether is added and after 20 minutes of vigorous stirring the ethereal solution of hydroxylamine is separated. The ether solution is then oxidized for ½ hour by stirring it vigorously with 158 (0.48 mole) of potassium ferricyanide dissolved in 1 liter of water containing 20 g. of sodium hydroxide at room temperature. At the end of this time the layers are separated, the ether evaporated and the orange organic residue taken up in warm petroleum ether. Upon cooling, 5.9 g. of N-benzhydryl-N-t-butyl nitroxide was obtained as glistening golden needles, M.P. 106° C.

Example 2.—t-Butyl di-1-naphthylmethyl nitroxide

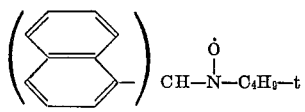

1-naphthyl lithium (0.2 mole) is prepared in ether (150 ml.) from 1-bromonaphthalene and metallic lithium. To this solution is added dropwise 45 g. (0.2 mole) of N-t-butylnaphthaldoxime prepared by the method of W. D. Emmons, J. Am. Chem. Soc., 79, 5739 (1957). After addition is complete (1 hour), the reaction mixture is hydrolyzed and subjected directly to potassium ferricyanide oxidation as in Example 1. After ½ hour, the ether layer is separated from the partially spent ferricyanide solution and evaporated to give crude t-butyl-di-1-naphthylmethyl nitroxide. This is purified by recrystallization from boiling cyclohexane.

Example 3.—Bis(p-chlorophenyl)methyl-1,1,3,3-tetramethylbutyl nitroxide

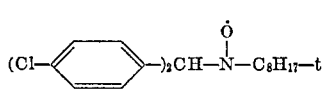

N-t-octyl-p-chlorobenzaldoxime, 53 g. (0.2 mole) in 100 ml. of ether is added dropwise to 0.2 mole of p-chlorophenyl lithium in 150 ml. of ether. The reaction mixture after hydrolysis is oxidized as in Example 1. After oxidation and evaporation of the ether, the crude product is recrystallized from cyclohexane to give yellow crystalline bis(p-chlorophenyl)methyl-1,1,3,3-tetramethylbutyl nitroxide.

Example 4.—Bis(p-methoxyphenyl)methyl t-butyl nitroxide

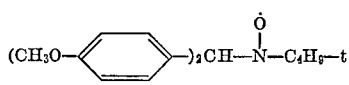

To an ether solution of N-t-butyl-p-methoxybenzadoxime, 41 g. (0.2 mole), is added an ether solution of 0.2 mole of p-methoxyphenyl lithium. After hydrolysis the crude reaction mass is oxidized as in Example 1 and the ether evaporated. The crude product is recrystallized from ethanol to give orange needles of bis(p-methoxyphenyl)methyl-t-butyl nitroxide.

Example 5.—t-butyl α-(p-chlorophenyl)-p-dimethylamino-benzyl nitroxide

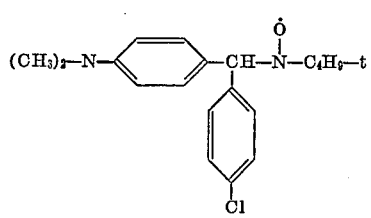

An ether solution of N-t-butyl-p-chlorophenylbenzaldoxime, 42 g. (0.2 mole), is added dropwise to 0.2 mole of p-dimethylaminophenyllithium in ether at 0° C. After addition is complete, the reaction mass is stirred at 0° C. for 1 hour prior to hydrolysis. The ether layer is oxidized as in Example 1, separated and evaporated. The crude product is crystallized from benzene to give t-butyl-α-(p-chlorophenyl)-p-dimethylaminobenzyl nitroxide as glistening orange platelets.

Examples 6–16

Substantially in accordance with Example 1 the following stable free radicals are prepared:

(6) t-Butyl 1-isopropyl-2,2-di-methylpropyl nitroxide

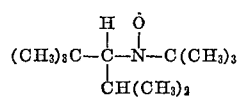

(7) t-Butyl di-p-tolylmethyl nitroxide

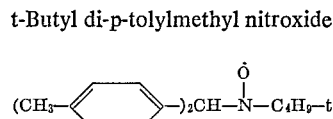

(8) Bis(2-chloro-1-naphthyl)methyl t-butyl nitroxide

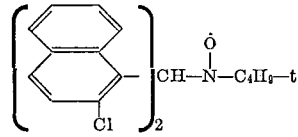

(9) Bis[o-(methylthio)phenyl]methyl t-butyl nitroxide

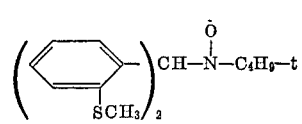

(10) Bis(p-carboxyphenyl)methyl t-butyl nitroxide

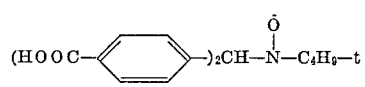

(11) Bis(p-dimethylaminophenyl)methyl t-butyl nitroxide

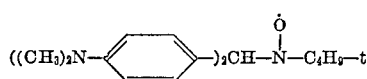

(12) t-Butyl α-tert-butyl-p-methylbenzyl nitroxide

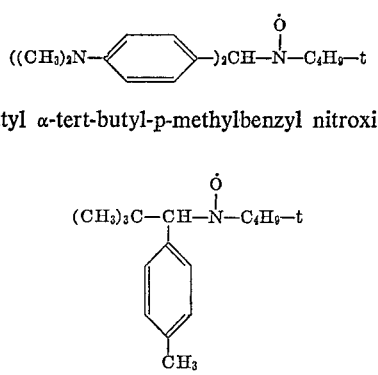

(13) t-Butyl p-chloro-α-phenyl-benzyl nitroxide

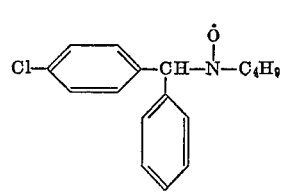

(14)
  p-Methoxy-α-phenylbenzyl 1,1,3,3-tetramethylbutyl nitroxide

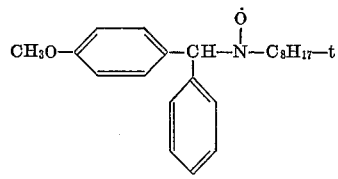

(15)
  t-Butyl α-(p-carboxyphenyl)-2,6-dimethoxybenzyl nitroxide

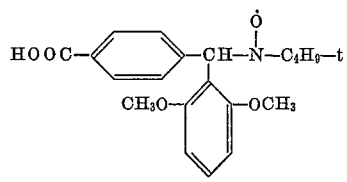

(16)
  t-Butyl α-(p-dimethylaminophenyl)-2,4,6-trimethoxybenzyl nitroxide

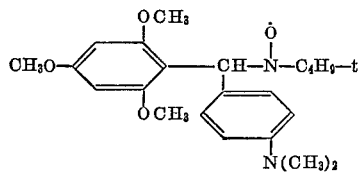

We claim:
1. Nitroxides of the formula

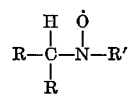

wherein R is selected from the group consisting of tertiary alkyl, aryl, alkaryl, haloaryl, carboxyaryl, alkoxyaryl, alkylthioaryl, pyridyl and dialkylaminoaryl, and R' is tertiary alkyl.
2. N-benzhydryl N-t-butyl nitroxide.
3. t-Butyl di-1-naphthylmethyl nitroxide.
4. Bis(p-chlorophenyl)methyl 1,1,3,3-tetramethylbutyl nitroxide.
5. Bis(p-methoxyphenyl)methyl t-butyl nitroxide.
6. t-Butyl α-(p-chlorophenyl)-p-dimethyl-aminobenzyl nitroxide.

References Cited
UNITED STATES PATENTS
3,163,677  12/1964  Hoffmann et al. _____ 260—583

CHARLES B. PARKER, *Primary Examiner.*
R. HINES, *Assistant Examiner.*

U.S. Cl. X.R.

260—239, 566, 567.6, 518, 002, 583, 570.8 296; 252—402, 403